United States Patent [19]

Cooper et al.

[11] 3,781,559

[45] Dec. 25, 1973

[54] VARIABLE FIELD OF VIEW SCANNING SYSTEM

[75] Inventors: Erwin E. Cooper; Howard V. Kennedy, both of Dallas, Tex.

[73] Assignee: Texas Instruments Incorporated, Dallas, Tex.

[22] Filed: June 19, 1972

[21] Appl. No.: 263,918

[52] U.S. Cl. .................. 250/334, 250/339
[51] Int. Cl. .................. G01j 1/00
[58] Field of Search .................. 250/83.3 H, 83.3 HP, 250/334, 338, 339; 350/212

[56] References Cited

UNITED STATES PATENTS

| | | | |
|---|---|---|---|
| 2,958,802 | 12/1960 | Hammar et al. | 250/83.3 HP X |
| 2,989,643 | 6/1961 | Scanlon | 250/83.3 H X |
| 3,224,332 | 12/1965 | Mikusch | 350/212 |
| 3,278,746 | 10/1966 | Fiat | 250/83.3 H |
| 3,287,559 | 11/1966 | Barnes | 250/83.3 HP X |
| 3,387,140 | 6/1968 | Roth et al. | 350/212 X |
| 3,652,856 | 3/1972 | Paul | 250/83.3 HP |

*Primary Examiner*—Archie R. Borchelt
*Attorney*—Harold Levine et al.

[57] ABSTRACT

A system for transforming incoming radiant energy (e.g., in the infrared region) having different fields of view into a visible real time image. Two scanning mirror surfaces are supported on a common mounting element. An afocal optical section varies the field of view of the incoming radiant energy. The afocal section accepts incoming collimated radiant energy and produces exiting collimated energy having a different beam diameter thereby changing the field of view of the system without having to modify the basic scanning optics. The collimated radiant energy exiting from the afocal section is reflected from one of the scanning mirror surfaces onto a plurality of detectors. Video circuitry coupling the detectors with a plurality of emitters modulates the emitters to produce light therefrom to be reflected from the other of said mirror surfaces. The image thus scanned is focused on a vidicon thereby producing a video signal that is coupled to a television display which produces a visible image of the incoming radiant energy.

24 Claims, 15 Drawing Figures

VARIABLE FIELD OF VIEW SCANNING SYSTEM

This invention relates to a night imaging system and more particularly to an optical system for converting incoming radiant energy having different fields of view to a visible image in real time.

Most prior art scanning systems utilize rotating mirrors, rotating detectors and oscillating mirrors without electro-optic multiplexing. The rotating mirror scan is limited by the difficulties in cold shielding of the detector array, the limited scan duty cycle and lens design constraint imposed by the scan mirror fold. The rotating detector scan has disadvantages because of the limited packaging capability due to the rotating section and difficulties associated with a 100% scan duty cycle and circular raster. The oscillating mirror scan has difficulties in tracking or picking off the mirror angle position for displaying the imagery properly, difficulty in maintaining focus with the oscillating mirror in the image plane and utilizing the mirror scan in two directions to obtain a good scan duty cycle. Many of these problems can be overcome by utilizing electro-optic multiplexing. Furthermore in utilizing these types of scanning systems, changing the field of view of the incoming radiant energy proves difficult in that interchangeable lens systems are difficult to design to match the parameters of the optics of the scanning system and usually requires a large number of optical elements. Furthermore prior art scanning systems exhibit problems in maintaining focus throughout the scan cycle when different fields of view are utilized.

Accordingly it is an object of the present invention to provide a scanning system which is simple of design and allows retention of focus after changing the field of view.

Another object of the present invention is to provide a scanning system in the collimated portion of the optical path thereby to simplify the optical design.

Another object of the present invention is to provide an optical scanning system which reduces the number of optical elements required to change the field of view of the system.

Another object is to provide an imaging system with improved spatial and thermal resolution.

A still further object is to provide an optical section in front of the scanning system so that movement of the scanning system on the emitter side will produce the same motion on the emitter scan as that produced by the radiant energy scan in the object plane.

A still further object of this invention is to provide an imaging system which is small in size, weight, power consumption and which is simple and of high reliability.

Other objects of the invention will become more readily understood from the following detailed description and appended claims when read in conjunction with the accompanying drawings in which like reference numerals designate like parts throughout the figures thereof and in which:

Figure 1:
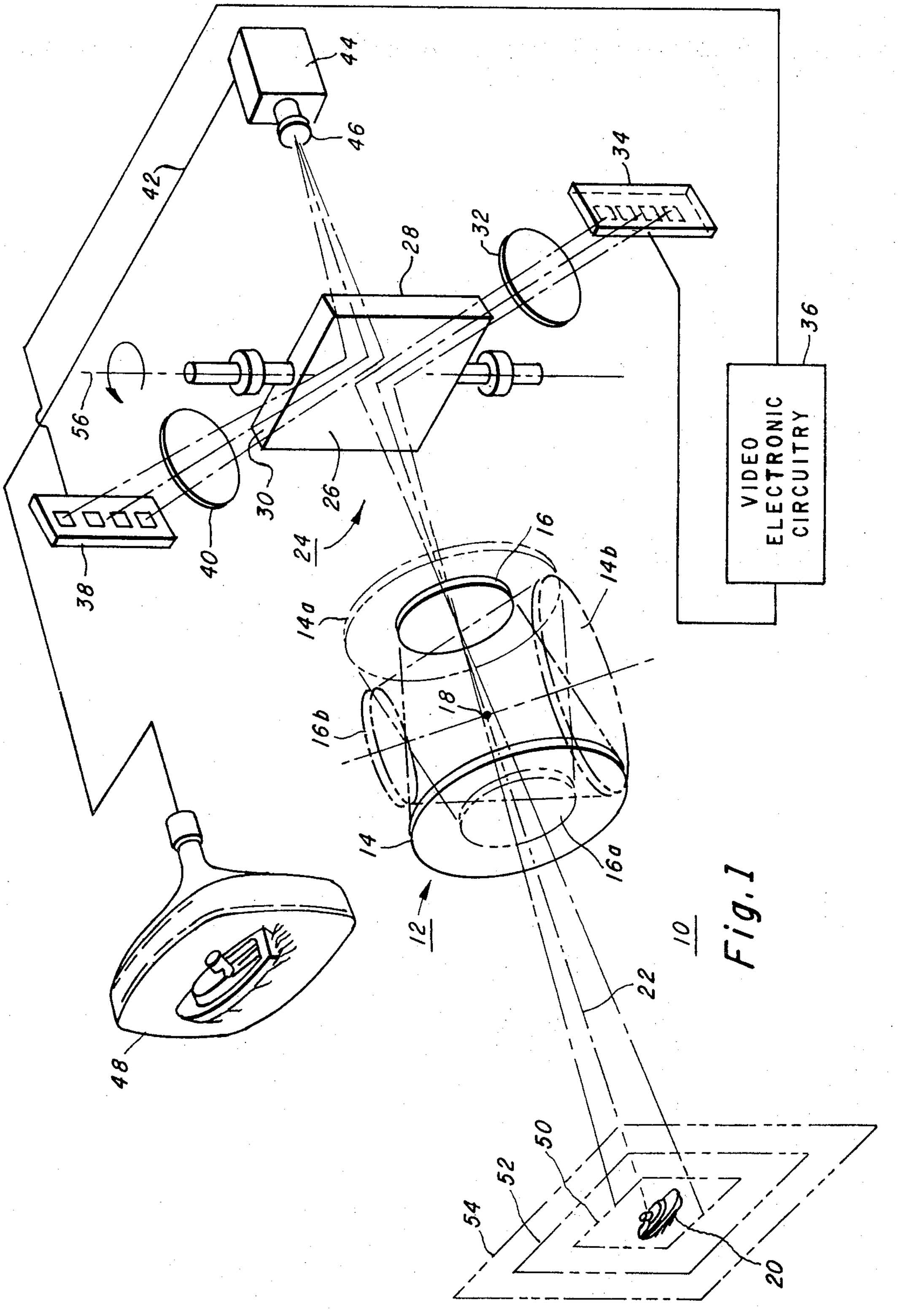
FIG. 1 is a simplified isometric view of the radiant energy scanning system according to the present invention.
Figures 5A, 5B:
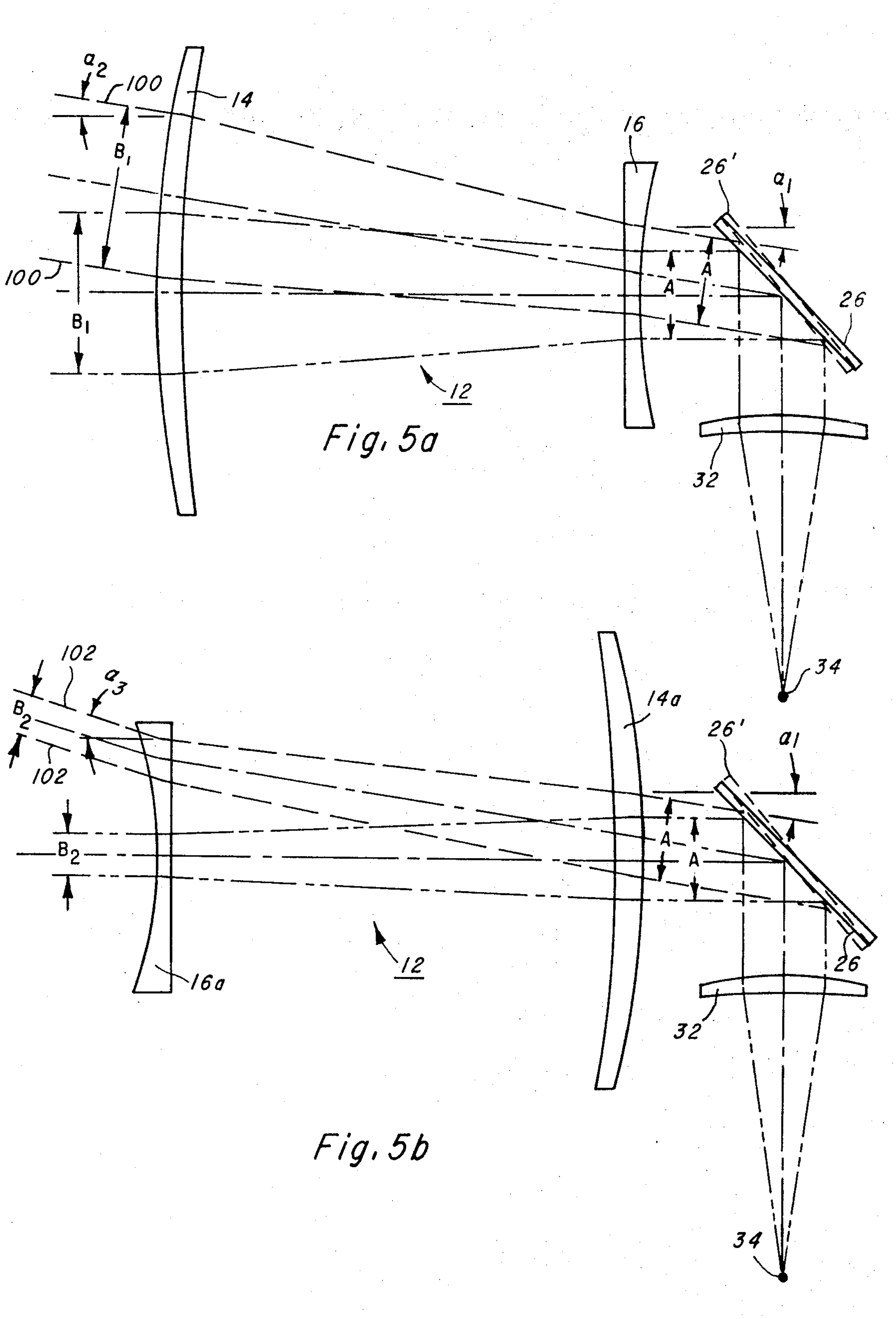
Figure 6:
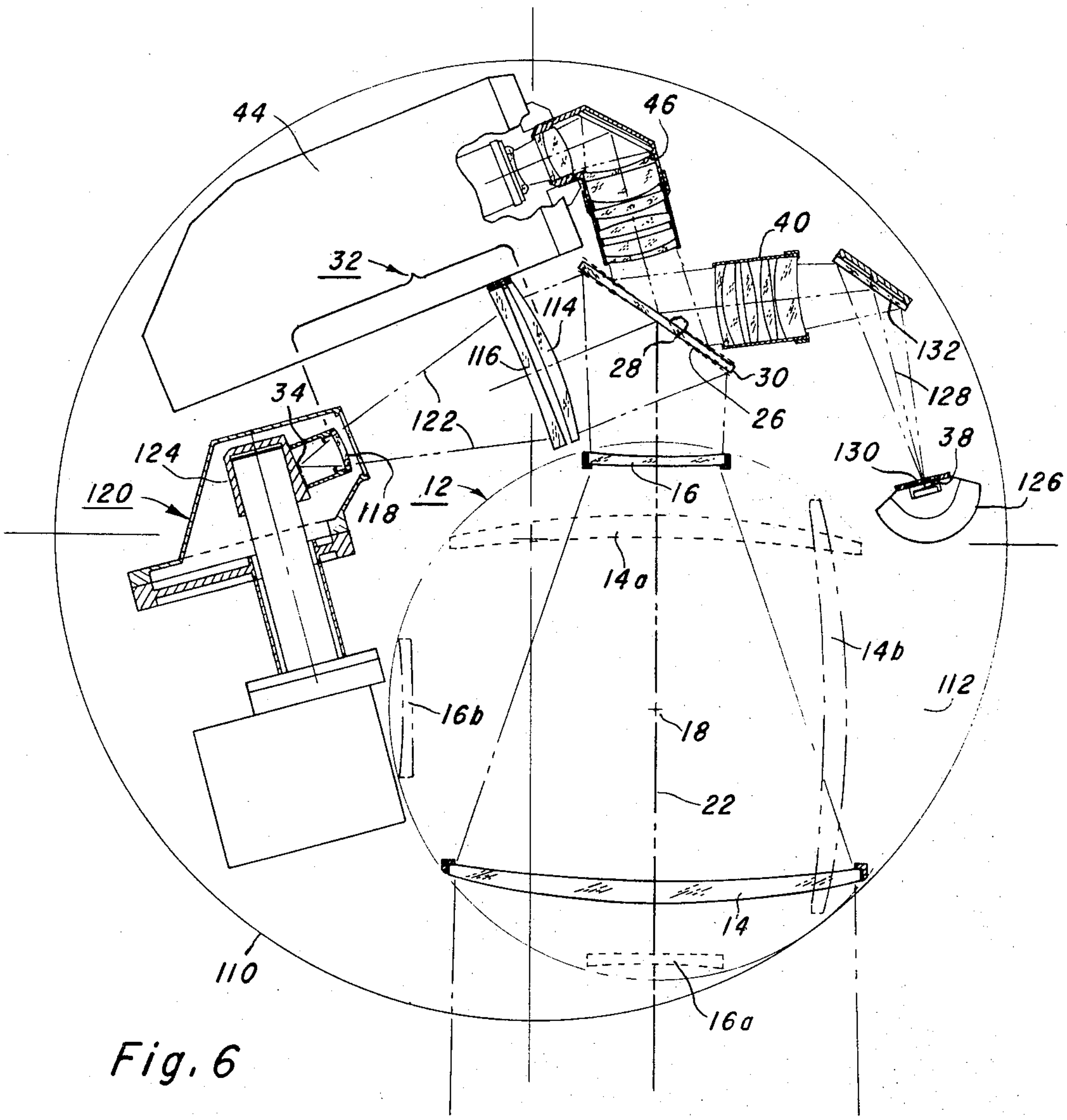
Figure 7A:
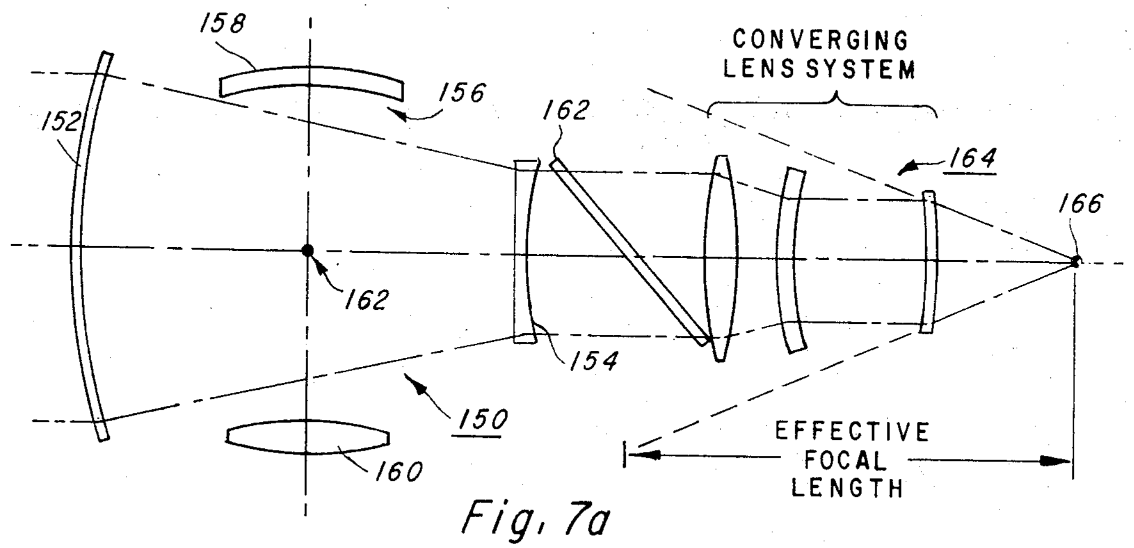
Figure 7B:
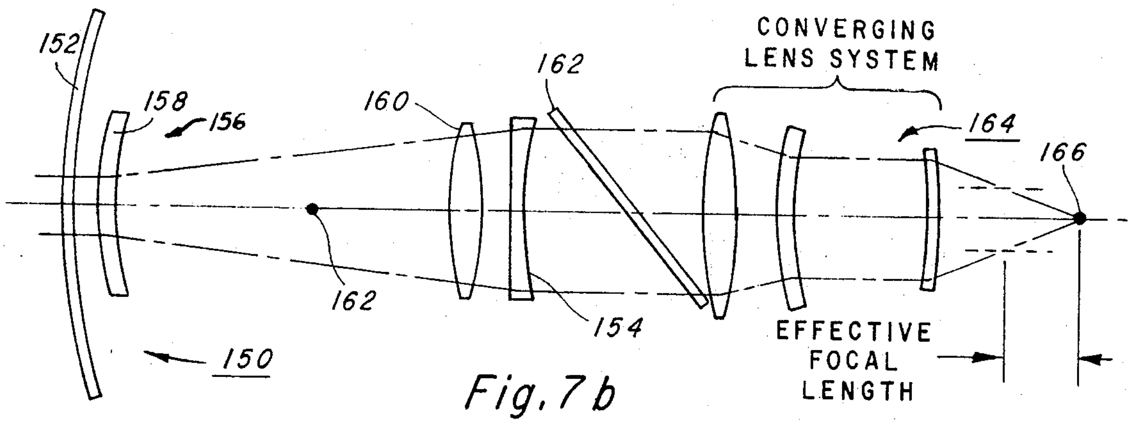

FIGS. 4*a*–4*f* illustrate the various positions of the afocal optical section of the scanning system illustrated in FIG. 1;

FIGS. 5*a*–5*b* illustrate the beam angle change through the afocal section for the narrow and wide field of views caused by the mirror scanner movement;

FIG. 6 is a simplified side view of the physical configuration of the system illustrated in FIG. 1;

FIGS. 7*a*–7*b* illustrate an alternate embodiment of the afocal section; and

Figure 8:
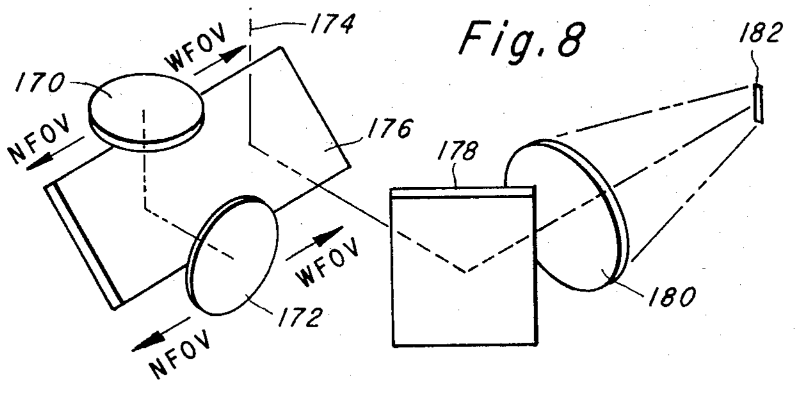

FIG. 8 illustrates a further embodiment of an afocal section which can be used according to the present invention.

Referring now to FIG. 1, a radiant energy scanning display system in accordance with the present invention is indicated generally by the reference numeral 10. This system converts incoming radiant energy (which for purposes of explanation will be assumed to be in the infrared region of the spectrum) in real time into a video signal which in turn is converted to a visual image. The infrared receiver portion of system 10 is composed of an afocal optical section 12 which, in one embodiment, is comprised of two lenses 14 and 16 mounted on a common mounting element (not shown) and mounted for movement about a point 18 between lenses 14 and 16 to any one of three positions; the other two positions **14*a*–16*a* and 14*b*–16*b* are shown in dotted outline form. Incoming radiant energy or infrared energy from a target or object 20 passes through afocal section 12 along the optical axis 22 of the system and impinges upon the scanner assembly 24 which is comprised of front mirror 26 and back mirror 28 on a common mirror mount 30; this could take the form of a glass mount with mirrored surfaces on each side. For a more detailed description of the scanning system 24, reference is made to copending patent application Ser. No. 97,753 filed Dec. 14, 1970 entitled "Two Axes Angularly Indexing Scanning Display" assigned to the same assignee as the present application. Scan mirror 26 is positioned nominally at an angle of 45° to optical axis 22. The incoming collimated radiant energy from afocal section 12 is reflected from scan mirror 26 through a converging lens system 32 which may comprise one or more lenses. Lens system 32 converges the incoming radiant or infrared energy upon a plurality of detectors 34. The detector array 34 may be of any conventional type and may be, for example, a linear array of mercury cadimum teluride (HgCdTe) detectors sensitive to infrared energy in the 8 to 14 micron range. The individual detectors may be spaced or contiguous dependent upon the specific application. The electrical signal produced by each individual detector 34 is amplified by means of a separate channel in video electronic circuitry 36 and then applied to a corresponding emitter of an array of emitters 38. The number of emitters 38 will generally correspond in number and spatial format to the number of detectors in the array of detectors 34. As mentioned previously, the video electronics circuitry 36 couples each detector channel with the corresponding emitter and provides the signal processing and auxiliary functions to modulate the output from each emitter 38. The emitter array 38 may be composed of, for example, gallium arsenide phosphide (GaAsP) diode elements such as the type manufactured and sold by Texas Instruments Incorporated. The energy output of emitters 38 may be in the visible region and impinges upon back mirror 28 after passing through the collimating lens system 40 which may be comprised of one or more lenses. The visible collimated light reflected from back mirror 28 may be converted to a video signal output 42 by television (TV) camera 44 such as the ruggedized version 4503A of the standard RCA 8507 vidicon or viewed directly. TV camera 44 may also have one or more collimating lenses 46 compatible with collimating lens system 40. Camera 44 may use standard broadcast scan rates, or special scan rates, to produce video signal output 42 which may then be used to operate a conventional television receiver tube 48 to visually reproduce the object or target 20. The coupling between camera 44 and receiver tube 48** may be a cable or by radio link using any conventional system.

The field of view of the image displayed by TV receiver tube 48 will depend upon the position of the lenses 14 and 16 in afocal optical section 12. An afocal optical section is defined as an optical system which converts collimated energy having one beam diameter to collimated energy having a different beam diameter; this principle may be used to vary the field of view of the radiant energy scanning system 12. With the afocal optical section 12 shown in the position defined by lenses 14 and 16, receiver tube 48 will display a narrow field of view corresponding to field of view 50. With afocal section 12 rotated about point 18 such that the lenses are in a position corresponding to **14*a*–16*a* and then 14*b*–16*b*, the field of view displayed by TV receiver tube 48 will be selectively varied to the wide field of view 54 and middle field of view 52, respectively. This will be described in more detail below with respect to FIGS. 4*a*–4*f*.**

Figure 2:
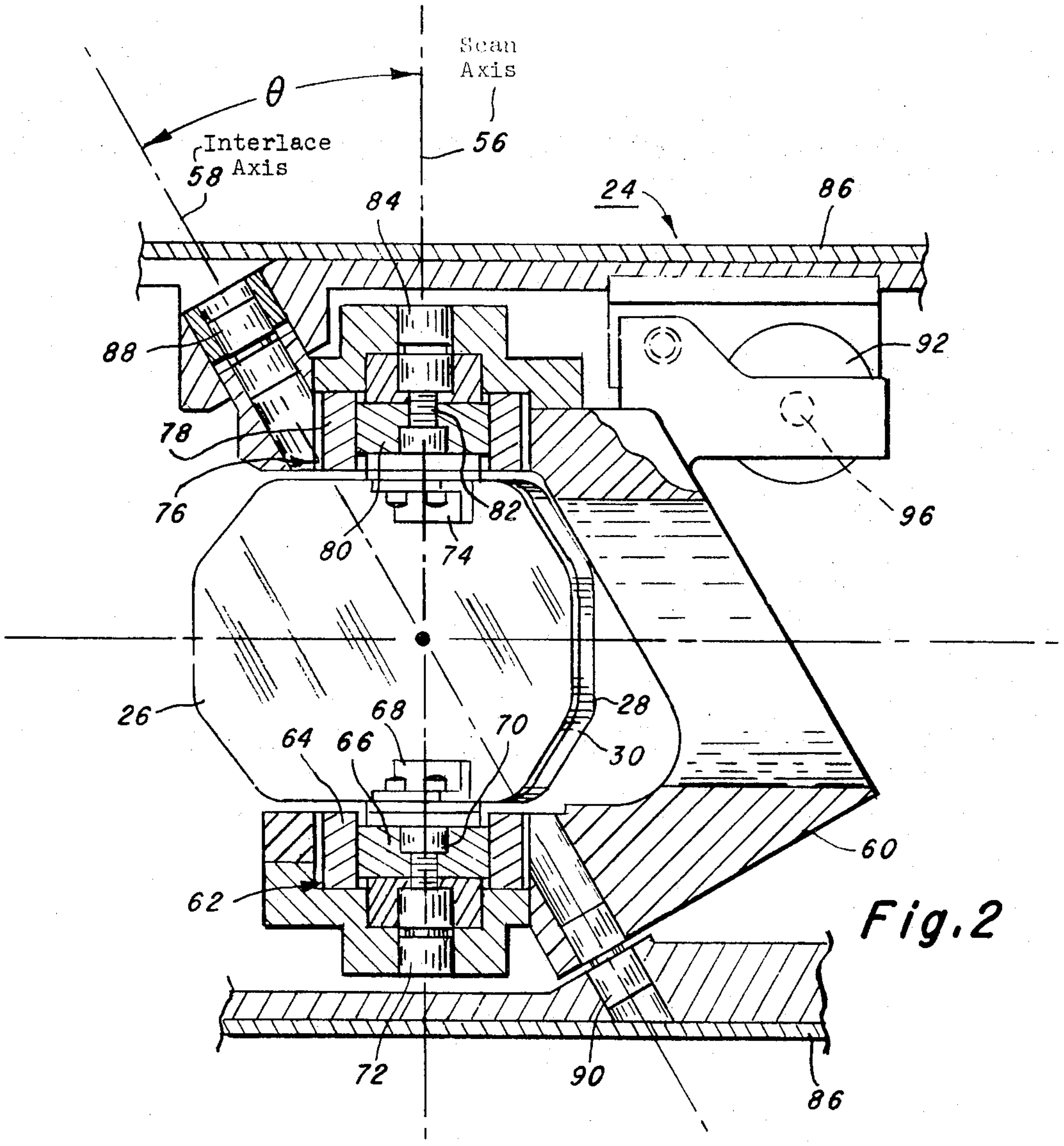
FIG. 2 is a cross section of the scanner and driver mechanism therefor.

Referring now to FIG. 2, it will be seen that scan mirror 24 moves about a first and second axis, namely scan axis 56 and interlace axis 58. Interlace axis 58 is positioned at an angle $\theta$ which is less than 90° from scan axis 56. As mentioned previously, scan mirror 26 and 28 are mounted at an angle of approximately 45° to the optical axis 22. The scan mirror assembly 24 provides the scanning for both the infrared portion and the visible portion of the system 10 (illustrated in FIG. 1). Vertical scan and display are effectively provided by using vertically oriented linear arrays of infrared detectors 34 and light emitting diodes 38. These elements are spaced such that a 2:1 interlace, obtained by tilting the scan mirror a few milliradians about interlace axis 58, allows a 2:1 reduction in the number of channels required in system 10. If, on the other hand, contiguous detectors and emitters are used, increased thermal resolution and reliability is thereby achieved.

Horizontal scanning of the mirror 26 occurs about scan axis 56. Typically, scan mirror 26 is rotated 7.5° for a total horizontal scan of 15°. The scan mirror may rotate at a constant velocity during the 7.5° horizontal scan, which will occupy typically between 80 and 90 percent of the scan cycle time period. The remaining time period in each cycle (referred to as the dead time) may be alloted for reversing the scan mirror direction of movement or rotation. Tilting the mirror for the interlace will also occur during this dead time period. Mirror 26 is mounted on a gimbal or link member 60. A small, brushless d.c. torque motor provides the drive function around scan axis 56. The torque motor 62 is comprised of a stator 64 and a rotor 66. Integral with the rotor 66 is a mirror clamp 68 which clamps mirror 26 to rotor 66. Threaded coupling 70 secures rotor 66 to bearing or flex pivot 72.

The mirror is attached at its upper end by way of mirror clamp 74 to a tachometer 76 which provides a feedback signal which is used for rate sensing. Tachometer 76 is comprised of a stator 78 and rotor 80 to which mirror clamp 74 is mounted. Threaded coupling 82 holds rotor 80 in engagement with the bearing or flex pivot 84.

Gimbal or link member 60 may be moved or tilted at a predetermined time in the scanning cycle (i.e., during the dead time of the scan cycle) around interlace axis 58. Link 60 is mounted to a housing 86 by way of two bearings or flex pivots 88 and 90. These flex pivots, consisting of crossed leaf springs, are characteristically rugged, have low friction and are lightweight. Flex pivots 88 and 90 allow link 60 (and therefore mirror 26) to move or tilt around interlace axis 58. Two solenoids 92 and 94 (94 not shown) are in line and provide the interlace drive motion by allowing the gimbal or link 60 and mirror 26 to tilt about the interlace axis upon actuation of either solenoid 92 or 94. The shafts of solenoids 92 and 94 are connected to link 60 (only shaft 96 associated with solenoid 92 being shown). When solenoids 92 or 94 are actuated, their shafts will pull link 62 thereby causing it to tilt about the interlace axis 58 a prescribed amount (in the order of a few milliradians).

Figure 3:
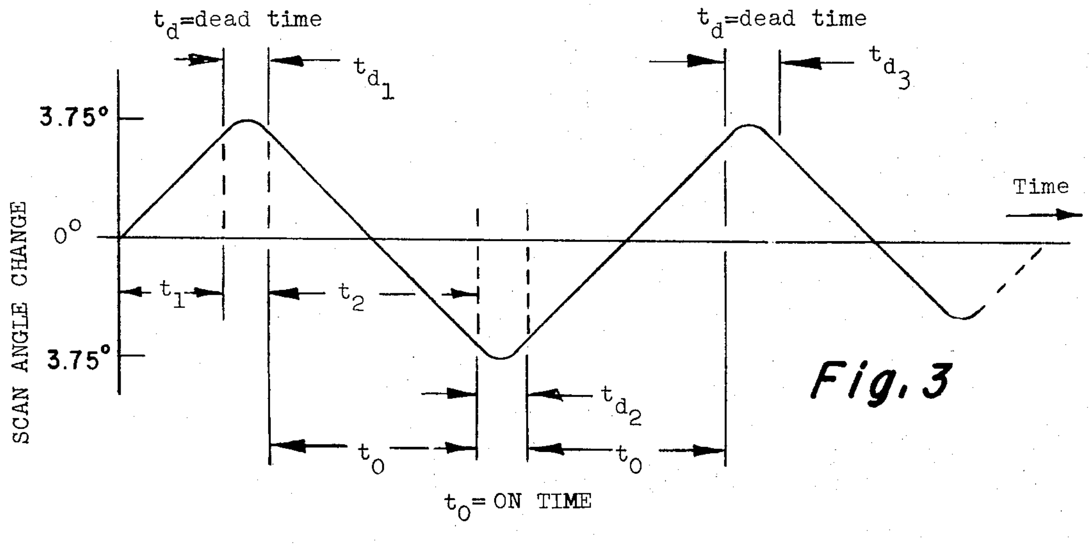
FIG. 3 illustrates the scan angle change as a function of time.

FIG. 3 illustrates the relationship between the scan angle change of mirror 26 with time. As will be noted from FIG. 3, scan mirror 26 rotates 3.75° from its 0° position which is nominally at a 45° angle with the optical axis 22. In other words, scan mirror 26 will move through an angle between 41.25° and 48.75° with respect to optical axis 22. As designated in FIG. 3, the time required for mirror 26 to move ± 3.75° corresponds to the "on" time, $t_0$, while the time required for scan mirror 26 to index or tilt (interlace) is designated as the "dead" time $t_d$. The "on" time of the scanner may be approximately 80% of the total duty cycle of the scanner. It will be noted from FIG. 3 that a linear scan (constant angular velocity or scan rate) is utilized during the "on" time of the scanner. The "dead" time ($t_d$) of each time period is allocated for reversing the direction of rotation of scan mirror 26 and further for tilting mirror 26 for interlace. Other drive functions can be utilized with the scanner of FIG. 2.

Figures 4A, 4B, 4C, 4D, 4E, 4F:
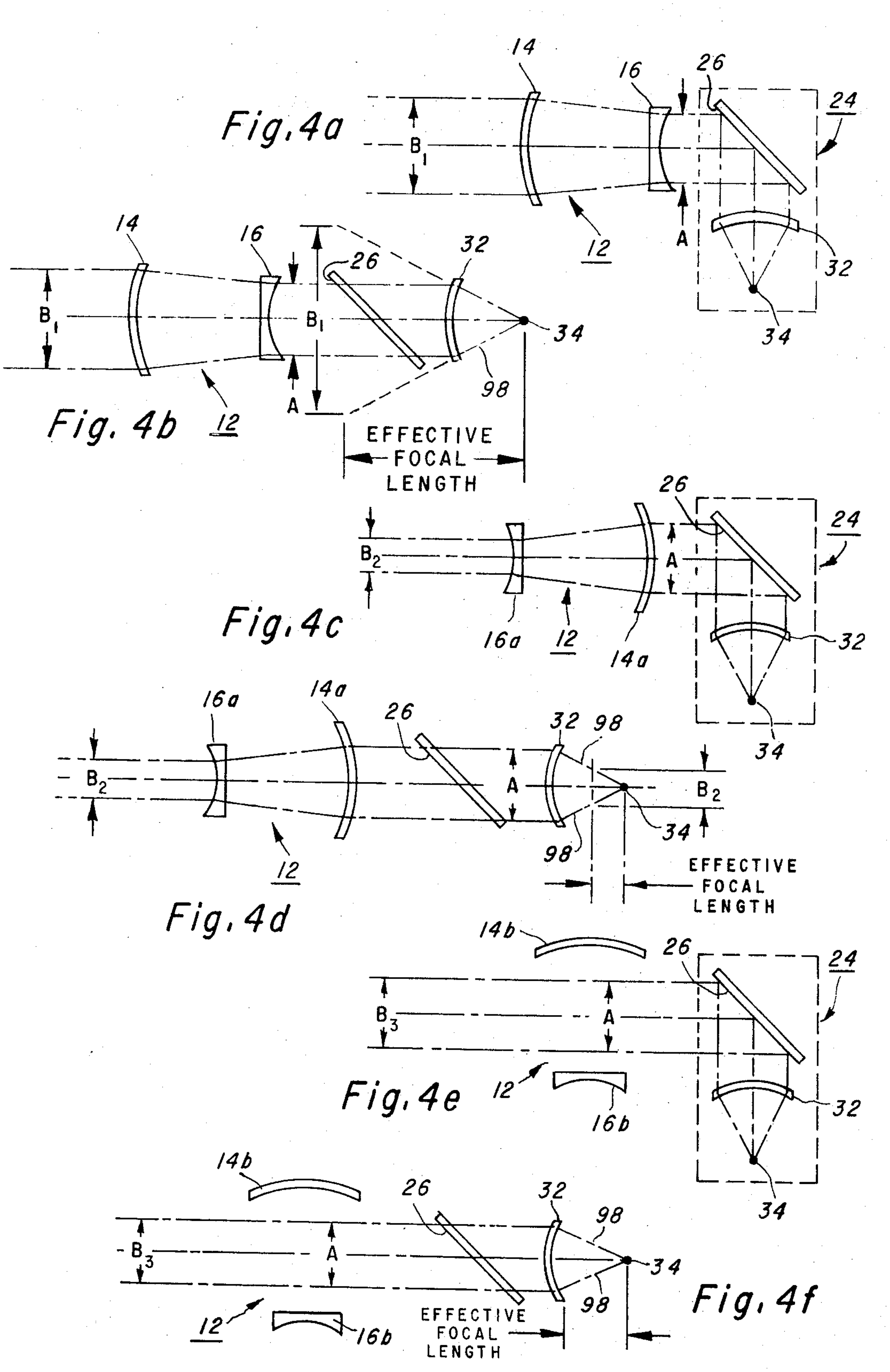

There is illustrated in FIGS. **4*a*–4*b* the position of afocal section 12 for the narrow field of view 50, in FIGS. 4*c*–4*d* the position of afocal section 12 for the wide field of view 54, and in FIGS. 4*e*–4*f* the position of afocal section 12 for the middle field of view 52. FIGS. 4*b*, 4*d* and 4*f* are identical to FIGS. 4*a*, 4*c* and 4*e*, respectively, except that the converging lens system 32 and detector array 34 in scanning assembly 24** is shown in its unfolded optical configuration for purposes of simplification of explanation.

It will be noted that for each field of view (illustrated in FIGS. **4*b*, 4*d* and 4*f*) that the beam diameter A of the exiting energy is the same and is fixed by converging lens 32 and that the beam angle is set by the motion of scan mirror 26 (this will be explained further with respect to FIGS. 5*a*–5*b*). The incoming radiant energy in all three fields of view is collimated and is illustrated as parallel to the optical axis 22 (shown in FIG. 1). In other words, incoming collimated energy having beam diameter $B_n$ enters the afocal optical section 12 and exits from the afocal section still being collimated but having a beam size A which is constant for all three fields of view (narrow, middle and wide field of view) and is fixed by converging lens 32**. The field of view of an optical system is inversely related to the effective focal length of that system. In addition, the field of view of an optical system is inversely related to the ratio of the beam diameter of the incoming energy to the beam diameter of the exiting energy (i.e., inversely related to $B_n/A$).

Referring now to FIG. 4*b* it can be seen that the incoming radiant energy having a beam diameter $B_1$ converges as it passes through afocal section 12 comprised of lenses 14 and 16 and exits from afocal section 12 having a beam diameter A. The effective focal length of this optical system can be determined by extending the rays 98 from detector array 34 until the rays reach a size equal to beam diameter $B_1$. Looking at it another way, the ratio of the beam diameters $B_1$ to A ($B_1/A$) will be greater than 1.

Looking now at FIG. 4*d*, it can be seen that incoming radiant energy having a beam diameter $B_2$ passes through afocal section 12 and diverges through lenses 16*a* and 14*a* and exits from afocal section 12 having a beam diameter A. To determine the effective focal length of the optical system shown in FIG. 4*d*, the rays 98 from detector array 34 are extended until they reach the beam diameter size $B_2$. Since the beam diameter $B_2$ is smaller than the beam diameter $B_1$ (of FIG. 4*b*), the effective focal length of the optical system in FIG. 4*d* is smaller than that illustrated in FIG. 4*b*. Stated another way, the ratio of beam diameters $B_2$ to A ($B_2/A$) is less than 1. Since, as mentioned above, the effective focal length is inversely proportional to the field of view, the field of view of the system illustrated in FIG. 4*d* will be larger than that illustrated in FIG. 4*b*.

When the afocal section 12 is further rotated, a third position is obtained as illustrated in FIG. 4*f* wherein afocal section 12 is eliminated totally from the optical path of the system. In this position, the incoming collimated radiant energy has a beam diameter $B_3$ which is equal to the exiting beam diameter A and accordingly the ratio of the two is exactly 1. The effective focal length (i.e., the distance required for rays 98 to have a beam diameter equal to $B_3$) is the distance from converging lens 32 to detector array 34. Accordingly the effective focal length of the optical system illustrated in FIG. 4*f* is midway between the effective focal lengths illustrated in FIG. 4*b* and 4*d* and accordingly the field of view of the system illustrated in FIG. 4*f* is midway between the field of view in FIGS. 4*b* and 4*d* and corresponds to the field of view 52 (shown in FIG. 1).

FIGS. 5*a* and 5*b* illustrate the beam angle change through afocal section 12 for the narrow and wide field of views, respectively, caused by movement of scan mirror 26. In both FIGS. 5*a* and 5*b*, the scan mirror is shown in two positions defined by the solid line designated 26 and the dotted line designated 26' and allows easy understanding of the phenomenon involving the off-axis rays. The amount of scan movement of the scan mirror from mirror position 26 to mirror position 26' is equal in both FIGS. 5*a* and 5*b*. Further it is assumed that the radiant or infrared energy scanned by the scan mirror in mirror position 26 is parallel to the optical axis in both FIGS. 5*a* and 5*b*. Still further, the beam diameter exiting the afocal section 12 and reflecting from the scan mirror is a constant beam diameter A in both fields of view illustrated.

Referring now to FIG. 5*a*, it can be seen that the beam diameter of the energy entering afocal section 12 is $B_1$. When the scan mirror moves from its position 26 to 26', it will scan an angle as defined by energy rays 100. The angle $\alpha_1$ that the ray 100 makes as it exits lens 16 with respect to the optical axis is constant (and equal to twice the angle that the scan mirror subtends in moving from position 26 to 26'). The magnitude of the angle $\alpha_2$ that the energy ray 100 subtends with respect to the optical axis (for small angles) is dependent upon the following relationship:

$$(B_1/A) = (\alpha_1/\alpha_2) \quad (1)$$

In FIG. 5*b*, the beam size of incoming energy to afocal section 12 is $B_3$ while the exiting energy therefrom is equal to A. With the scan mirror moving from position 26 to 26', energy rays 102 will subtend to angle $\alpha_3$ with respect to the optical axis at lens 16*a* while subtending the same angle $\alpha_1$ with respect to the optical axis at lens 14*a*. The relationship between the angles subtended and the beam size in the wide field of view configuration is as follows:

$$(B_2/A) = (\alpha_1/\alpha_3) \quad (2)$$

Assume for example that beam diameter $B_1$ is twice A ($B_1 = 2A$) and that beam diameter $B_2$ is one-half of $A$ ($B_2 = ½ A$). Substituting the above two assumptions into Equations (1) and (2), we get $$2 = (\alpha_1/\alpha_2) \quad (3)$$

$$½ = (\alpha_1/\alpha_3) \quad (4)$$

Solving Equations (3) and (4) for $\alpha_3$, we get $$\alpha_3 = 4\ \alpha_2 \quad (5)$$

In other words, for the same movement of the scan mirror from position 26 to 26', in the wide field of view (FIG. 5*b*), the angle $\alpha_3$ scanned is 4 times the angle ($\alpha_2$) scanned in the narrow field of view (FIG. 5*a*). Accordingly it can be seen clearly how the motion of the scan mirror varies the beam angle according to the particular position of afocal section (either in the wide or narrow field of view).

FIG. 6 illustrates a typical mechanical packaging configuration of the radiant energy scanning system according to the present invention where corresponding components designate corresponding reference characters as illustrated in previous Figures. A stationary lens (not shown) forms a viewing window for an enclosed spherical housing 110. The spherical housing is typically mounted so that it can be pivoted about both the pitch and yaw axis of an aircraft to facilitate aiming the optical axis 22 at the desired target. Afocal section 12 is shown with the narrow field of view configuration in the active position (corresponding to FIGS. 4*a* and 4*b*). The middle and wide field of view positions are shown in dotted outlines. Lenses 14 and 16 comprising afocal optical means 12 are mounted on a simple member (not shown) which is rotated about point 18 between the lens to any one of the three positions previously described. It will be noted that the lenses 14 and 16 rotate within a cylinder of rotation 112. The collimating infrared energy exiting from afocal section 12 impinges upon the front oscillating scan mirror 26 and is reflected therefrom through converging lens system 32 comprised of three infrared lenses 114, 116 and 118; these lenses may be made of germanium, 1173 glass (manufactured and sold by Texas Instruments Incorporated) and germanium, respectively. Lens assembly 32 converges and focuses the infrared radiant energy from mirror 26 onto detector array 34. Lenses 14 and 16 are converging and diverging, respectively, and can be made of germanium. Although lens 16 is shown as diverging, it may be a converging lens if placed behind the focal point of converging lens 14.

Optical element 118 forming a part of converging lens system 32 is located within a closed cycle cryogenic cooler 120. The converging radiant or infrared energy 122 is focused by converging lens system 32 onto detector array 34 mounted on detector mount 124.

The output of detector array 34 is coupled through electronic video circuitry (not shown) to emitter array 38 mounted on heat sink 126. These emitters emit energy in an amount related to the energy incident upon detectors 34. The radiant energy 128, which may be in the visible region of the spectrum, passes through emitter window 130 and is reflected from folding mirror 132. The folded radiant energy then passes through collimating lens system 40 composed of a plurality of optical elements to thereby produce collimated light which impinges upon back mirror 28. Since front mirror 26 and back mirror 28 are mounted on a common mount 30, there are no synchronization deviations between the scan on the front side (involving the infrared energy from target 20 (FIG. 1)) and the back side (involving the visible display portion of the system). The scanned collimated light from mirror 28 passes through a TV collimating lens system 46 where a video signal is therefore produced by television camera 44.

FIGS. *7a–7b* illustrate an alternate embodiment of an afocal section 150. Afocal section 150 is comprised of two stationary lenses 152 and 154 which are converging and diverging, respectively. A movable, wide field of view insert 156 is comprised of two lenses 158 and 160 which are diverging and converging, respectively. Lenses 158 and 160 are rotatable about point 162 into a second position (the wide field of view) as shown in FIG. *6b*. In the position shown in FIG. *7a*, incoming radiant energy along the optical axis is converged through optical element 152 and exits optical element 154 having a beam diameter less than the beam diameter of the radiation entering element 152. The radiant energy impinges upon the front side of oscillating mirror 162 which performs the scanning function. Although the exiting radiant energy from diverging lens element 154 is reflected or folded down from scan mirror 162, the radiant energy is illustrated as continuing straight through for purposes of explanation. The scanned collimated energy is then reflected and converged through converging lens system 164 which focuses the scanned energy upon detectors 166. The effective focal length of converging lens system 164 is also illustrated.

FIG. *7b* illustrates the optical arrangement when the wide field of view insert 156 is rotated about point 162 into place. With this arrangement, the effective focal length of the system illustrated in FIG. *7b* is shorter than the effective focal length of the system illustrated in FIG. *7a*. Since the focal lengths vary inversely with the field of view, it will be recognized that the field of view of the system illustrated in FIG. *7b* will be wider than that illustrated in FIG. *7a*.

FIG. 8 illustrates a slightly modified embodiment to FIG. 1 and has two fields of view, a wide field of view (WFOV) and a narrow field of view (NFOV). Afocal lens elements 170 and 172 may be moved simultaneously into and out of optical path 174 as shown by the arrows indicating the direction of motion for the narrow field of view (NFOV) and wide field of view (WFOV). With lens elements 170 and 172 (which are diverging and converging, respectively) in the position shown, incoming radiant energy traveling along the optical axis 174 will be reflected from folding mirror 176 and scanned by scanning mirror 178. The scanned radiant energy will then pass through converging lens system 180 and impinge upon detector array 182. The theory of operation is similar to that explained in connection with FIG. *4f*. When lens elements 170 and 172 are moved into the optical path 174, a wide field of view is obtained. This is analogous to the situation explained in connection with FIG. *4d*.

Although a preferred embodiment of the invention has been described in detail, it is to be understood that various changes, substitutions and modifications of the invention may be suggested to one skilled in the art, and it is intended to encompass such changes, substitutions or modifications which do not depart from the spirit and scope of the invention as is defined by the appended claims.

What is claimed is:

1. An apparatus for scanning radiant energy from an area comprising:

a rotatable afocal optical means for selectively varying the field of view of incoming radiant energy from an area, at least one scanning mirror for receiving said incoming radiant energy from said afocal optical means, and detector means for receiving the radiant energy from said scanning mirror.

2. An apparatus according to claim 1 further comprising converging lens means positioned adjacent the detectors in the radiant energy path for focusing said radiant energy upon said detector means.

3. An apparatus for scanning radiant energy from an area comprising:

a rotatable afocal optical means for selectively accepting incoming collimated radiant energy having a first beam diameter and producing exiting collimated radiant energy having a second beam diameter, at least one scanning mirror for receiving said exiting radiant energy from said afocal optical means, converging lens means for receiving and focusing said exiting collimated radiant energy, and detector means for receiving the scanned focused radiant energy and producing an output signal that varies with the radiant energy incident thereon.

4. An apparatus according to claim 3 wherein said radiant energy is in the infrared region.

5. An apparatus according to claim 4 wherein said infrared region is in the 8 to 14 micron range.

6. An apparatus according to claim 4 wherein said detectors are HgCdTe.

7. An apparatus according to claim 3 wherein said afocal optical means comprise at least two lenses.

8. An apparatus according to claim 7 comprising additional lens means for insertion between said at least two lenses to vary the field of view.

9. An apparatus according to claim 7 wherein said at least two lenses are of germanium.

10. An apparatus according to claim 7 wherein one of said two lenses is converging and the other is diverging.

11. An apparatus according to claim 7 wherein both of said two lenses are converging.

12. An apparatus according to claim 3 further comprising:

emitter means coupled to said detector means and responsive to said output signal for producing radiant energy related to the energy impinging on said detector means, and at least one mirror associated with said emitter means and moving in synchronism with said at least one mirror for reflecting the radiant energy from said emitter means.

13. An apparatus according to claim 12 wherein said at least one scanning mirror and said at least one mirror associated with said emitter means comprise two mirrors on a common mounting element.

14. An apparatus according to claim 12 wherein said emitter means emits energy in the visible portion of the spectrum.

15. An apparatus according to claim 14 wherein said emitter means are made of GaAsP diodes.

16. An apparatus according to claim 12 further including means for converting the output from said emitter means to a video signal.

17. An apparatus according to claim 16 wherein said means for converting the output from said emitter means to a video signal comprises a television camera responsive to the output from said emitter means.

18. An apparatus according to claim 17 wherein said means for converting the output from said emitter means to a video signal further comprises collimating lens means interposed between said emitter means and said television camera.

19. An apparatus according to claim 17 further including a television display for producing a visible image from the video signal produced by said television camera.

20. An infrared scanning system comprising:

a converging-diverging lens system for accepting incoming collimated infrared energy having a first beam diameter and producing exiting collimated infrared energy having a second beam diameter, said converging-diverging lens system rotatable for selectively varying the field of view of incoming radiant energy from an area, at least one scanning mirror for receiving said exiting radiant energy from said lens system, converging lens means for receiving and focusing said exiting collimated infrared energy, and a plurality of infrared detectors for receiving the scanned focused radiant energy and producing an output signal that varies with the radiant energy incident thereon.

21. A system according to claim 21 further including additional lens means for insertion between said lens systems to vary the field of view.

22. A system according to claim 20 further comprising:

a plurality of light emitters corresponding substantially in number to the number of infrared detectors, said light emitters coupled to said infrared detectors for producing visible light related to the infrared energy impinging on said detectors, and at least one mirror optically associated with said emitters and mechanically coupled to said at least one scanning mirror for reflecting the visible light from said light emitters.

23. A system according to claim 22 further comprising a television camera responsive to the output from said light emitters for producing a video signal.

24. A system according to claim 23 further comprising a television display for producing a visible image from said video signal.

* * * * *